United States Patent [19]

Holliger

[11] Patent Number: 4,545,726
[45] Date of Patent: Oct. 8, 1985

[54] TURBINE

[75] Inventor: Karl Holliger, Zürich, Switzerland

[73] Assignee: Sulzer-Escher Wyss Ltd., Zürich, Switzerland

[21] Appl. No.: 379,630

[22] Filed: May 19, 1982

[30] Foreign Application Priority Data

Jun. 5, 1981 [CH] Switzerland ............ 3706/81

[51] Int. Cl.[4] ............................................. F03B 13/12
[52] U.S. Cl. .......................................... 415/26; 415/7; 416/223 A
[58] Field of Search ........... 416/223 R, 223 A, 231 B; 415/26.7, 55, 58, 212 A, 213 C, 152 R, 152 A, 212 R, 213 R, 199.4; 60/398

[56] References Cited

U.S. PATENT DOCUMENTS

| | | | |
|---|---|---|---|
| 2,224,519 | 12/1940 | McIntyre | 415/213 C |
| 3,860,361 | 1/1975 | McMurtry et al. | 416/231 B |
| 3,867,062 | 2/1975 | Troller | 416/223 A |
| 4,130,381 | 12/1978 | Levin et al. | 416/231 B |
| 4,221,538 | 9/1980 | Wells | 416/223 R |
| 4,313,711 | 2/1982 | Lee | 416/223 A |

FOREIGN PATENT DOCUMENTS 687499  8/1930  France ................ 416/231 B

Primary Examiner—Robert E. Garrett
Assistant Examiner—John Kwon
Attorney, Agent, or Firm—Werner W. Kleeman

[57] ABSTRACT

A turbine which rotates in the same directional sense for both directions of throughflow of a working medium contains rotor blades possessing an aerofoil-shaped profile which at least over a portion of the length of the rotor blades is subdivided into profile parts or portions in order to improve the flow of the working medium about the rotor blades. The profile parts of the rotor blades are non-symmetrically constructed or arranged at least in part with respect to each plane which is perpendicular to the momentary throughflow direction of the rotor. It is therefore possible to reduce the dimensions of the turbine with essentially the same power output. Such type of turbine is particularly suitable for extracting energy from the movement of waves of bodies of water, such as the sea water of the ocean, and air moved by the waves alternately in opposite directions serves as the working or flow medium.

16 Claims, 31 Drawing Figures

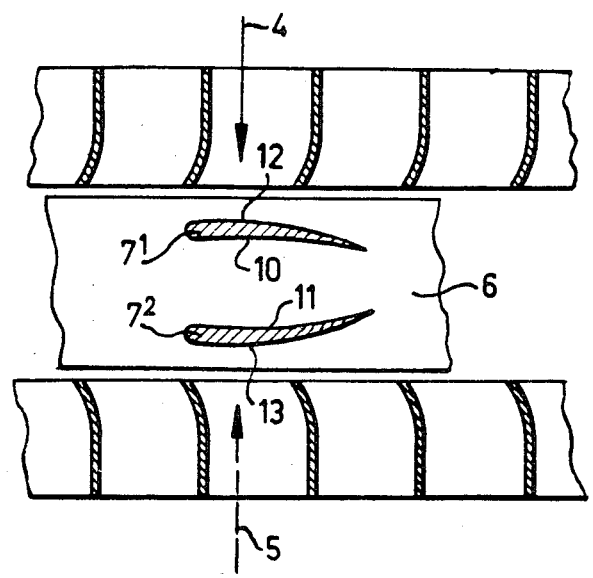
Fig. 3
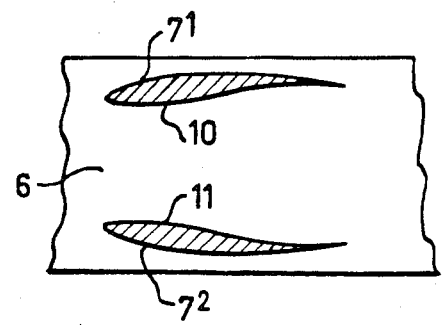
Fig. 4
Fig. 5
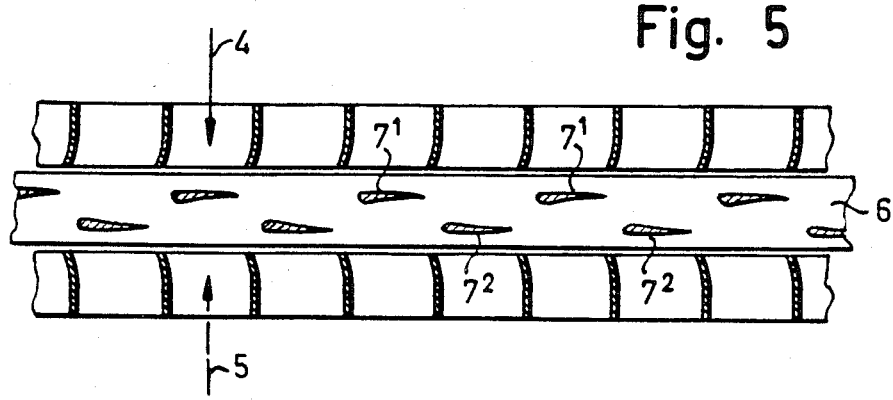

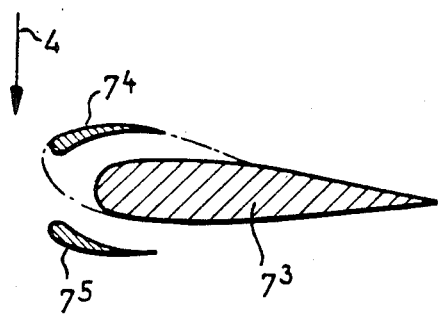
Fig. 6
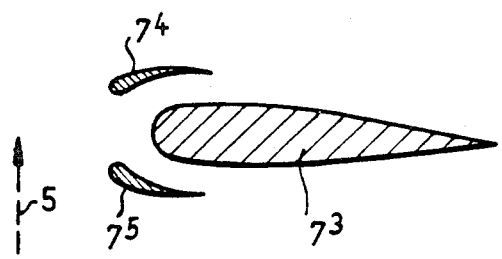
Fig. 7
Fig. 8
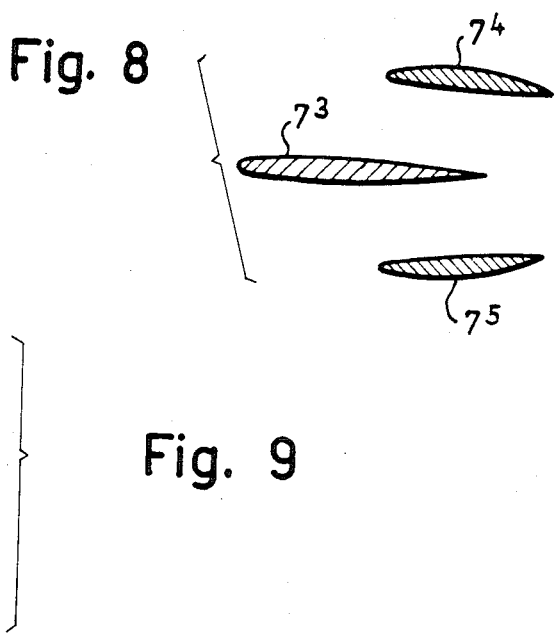
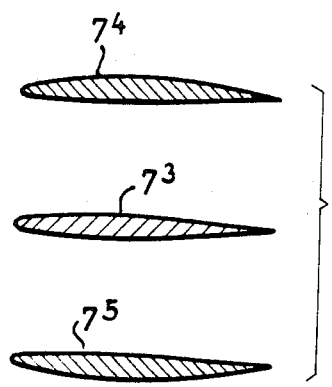
Fig. 9

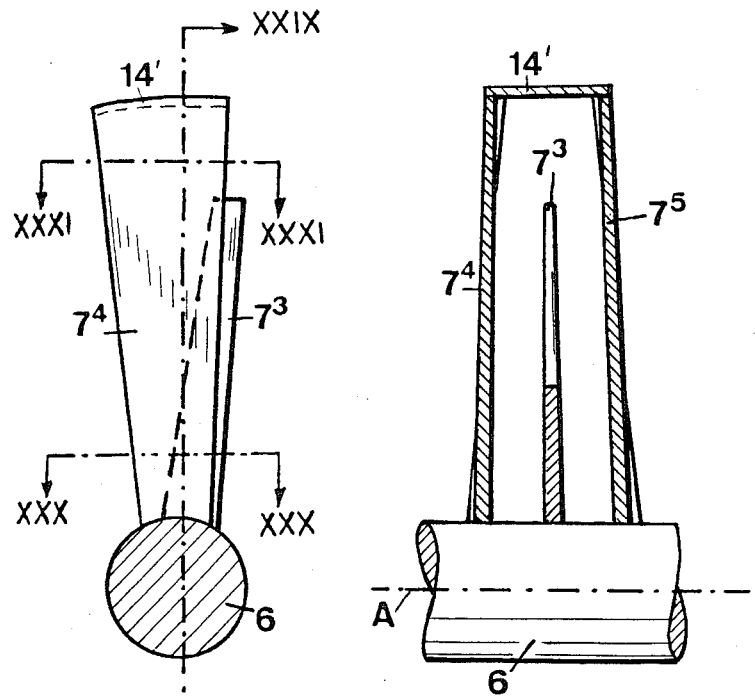
Fig. 28  Fig. 29
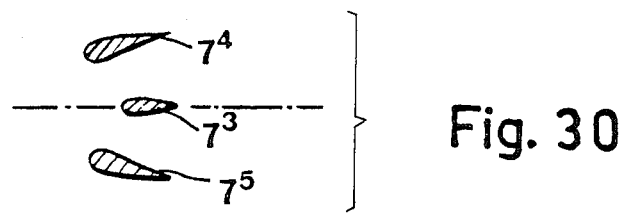
Fig. 30
Fig. 31

TURBINE

BACKGROUND OF THE INVENTION

The present invention relates to a new and improved construction of turbine containing a rotor possessing a hub and rotor blades possessing an aerofoil profile or aerofoil cross-section, a working or fluid medium flowing alternately in the one or in the other throughflow direction through the rotor, and the rotor rotating in the same directional sense during both throughflow directions of the working medium.

Under the expression "throughflow direction", as used in this disclosure, there is to be understood the direction of the meridional flow flowing through the rotor, i.e. the component of the flow of the working medium which lies in a plane, the meridional plane, which is taken through the axis of rotation of the rotor and a radian vector.

Such type of turbines are particularly suitable for extracting energy from the movement of the waves of the ocean, however other uses are possible.

In U.S. Pat. No. 4,221,538, granted Sept. 9, 1980 such type of turbine has been disclosed which operates with air as the working medium. This air turbine is mounted at the upper throat of a vessel which is open at its lower region and immerses in water. The water at the lower portion of the vessel ascends and descends under the influence of the waves. As a result, air flows out of the vessel through the vessel throat or flows into the vessel, as the case may be, i.e. the air is moved through the turbine alternately in opposite directions.

The rotor blades of the heretofore known air turbine are arranged in a plane disposed perpendicular to the axis of rotation of the rotor. The aerofoil-shaped profile of the rotor blades consists of a single part or portion which is arranged symmetrically to such plane. The forward end of the profile, viewed in the direction of rotation, is rounded with a larger radius than the rear end of the profile, again viewed with respect to the direction of rotation. If air flows through the throat of the vessel then there is formed at the better rounded forward end of the profile a smaller pressure than at the more intensely or markedly rounded rear end of the profile, which causes a pronounced break-away or detachment of the flow at that location, so that the rotor begins to rotate. Due to the rotation of the rotor there is formed a relative incident flow which is directed at an inclination towards the front end of the profile, constituting the resultant of the vectorial addition of the flow located in the plane of the rotor formed because of the circumferential velocity and the absolute inflow which is directed, if desired, through a guide apparatus or distributor. Because of the relative incident inflow located at an inclination with respect to the profile the rotor rotates and delivers an output or power. In the other opposite throughflow direction of the air the rotor operates in a corresponding manner, and it rotates in the same directional sense. Because of the mentioned symmetry of the rotor the output is low. While it is possible to attain an improvement in this design with an arrangement of symmetrical rotor blades in a number of parallel planes, as taught for instance in the British patent application No. 2,028,929, published Mar. 12, 1980, and the cognate U.S. Pat. No. 4,313,711, granted Feb. 2, 1982, there cannot however be obtained the maximum output and also no optimum efficiency.

Other constructions of turbines or wind motors known to the art have been respectively disclosed in U.S. Pat. No. 1,835,018, granted Dec. 8, 1931, and the published International PCT application PCT/AT79/00007, published Apr. 17, 1980, under International Publication Number WO 80/00733.

SUMMARY OF THE INVENTION

Therefore, with the foregoing in mind it is a primary object of the present invention to provide a new and improved construction of a turbine which is not afflicted with the aforementioned drawbacks and limitations of the prior art constructions.

Another and more specific object of the present invention aims at the provision of a new and improved construction of turbine whose power output and efficiency can be increased for a given size turbine, or else to reduce the size of a turbine while obtaining the same power output, and specifically for random gaseous or liquid flow media.

The invention is predicated upon the recognition that, the known turbines with symmetrical rotor blades are limited in the angle of attack or incidence of the relative incident flow because of the break-away of the flow with too large angle of attack or incidence.

The objects of the invention are realised in that, there is proposed a turbine construction according to the invention wherein the profile or cross-section of the rotor blades is subdivided into at least two profile portions or parts at least over a portion of the length of the rotor blades, in order to improve the flow of the working medium about the rotor blades. At least one of the profile parts or portions is non-symmetrical with respect to each plane perpendicular to the momentary throughflow direction.

Advantageously, there are provided two equal size profile parts or portions constructed as primary vanes or blades which are arranged in tandem or behind one another in the throughflow direction of the rotor and collectively form the rotor profile as a unit.

Preferably, the profile parts or portions are constructed to be flatter at their mutually confronting surfaces than at their surfaces which face away from one another. Additionally, it is advantageous if the mutual mean spacing of both profile parts or portions amounts up to approximately 1.5-fold of the chord length of a profile part, preferably 0.7-fold the chord length of a profile part or portion.

According to another advantageous construction of the invention the profile part can be, however, also inclined towards the planes which are perpendicular to the throughflow direction, in other words arranged non-symmetrically with respect thereto.

Moreover, the profile parts or portions of a unit can be arranged symmetrically opposite one another, or else offset with respect to one another, in the throughflow direction. According to a further construction of the invention the profile parts or portions are constructed as a primary blade or vane and as an auxiliary blade or vane. In this connection there can be advantageously provided a primary or main blade and two auxiliary blades located to both sides of the primary blade. For this construction it is desirable if the forward auxiliary blade, in the momentary throughflow direction of the rotor, bounds or delimits together with the primary blade an aerofoil profile, whereas the rear auxiliary blade for the same throughflow direction of the rotor forms a support blade for the bounded aerofoil profile.

According to a simple construction of the rotor the lengthwise direction of the blades extends away from the axis of rotation of the rotor. It is advantageous if the cross-section of the profile parts become more massive or fuller towards the axis of rotation of the rotor, and also if the profile parts or portions are designed for an incidence angle or angle of attack which increases in the direction of the axis of rotation of the rotor. In order to improve the strength of the blades the profile parts can be interconnected with one another, for instance, at their ends situated remote from the axis of rotation of the rotor. The connection can also extend from blade to blade over the entire circumference.

The lengthwise directions of the rotor blades, instead of being perpendicular, also can be disposed at an inclination or, in fact, parallel to the axis of rotation of the rotor. In this last-mentioned case there is realised the advantage of an exact equal incidence angle or angle of attack over the entire lengthwise direction of the rotor blades.

The heretofore discussed non-symmetric profile units possessing profile parts or portions are symmetric to a surface formed by the direction of revolving movement of the rotor blades. However, instead of such construction there also can be provided a profile part which is adjustable upon reversal of the throughflow direction of the rotor, so that the position of the profile parts or portions is symmetric during the one throughflow direction to the position of the profile parts during the other throughflow direction.

In the case where it is possible to adjust a profile part two primary blades can be displaceable relative to one another in the circumferential direction of the rotor, or there can be provided a stationary primary blade and one or two adjustable auxiliary blades, or an adjustable primary blade.

With all constructions herein contemplated there is advantageously provided a flow-favourable enlargement of the cross-section to both sides of the turbine, which ensures for the acceleration and deceleration of the working medium flow.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a sectional view taken parallel to the axis of rotation of a rotor through an air turbine installed in the throat or neck of a vessel or the like;

FIG. 3 is a cross-sectional view, corresponding to the showing of FIG. 2, of a further exemplary embodiment of air turbine;

FIG. 4 is a cross-section view, corresponding substantially to the showing of FIG. 2, through a turbine constructed according to a different embodiment and devoid of any guide vanes;

FIG. 5 is a cross-sectional view, corresponding to the showing of FIG. 2, through a further exemplary embodiment of turbine;

FIG. 6 illustrates a profile of a rotor blade wherein the working medium flows towards the rotor blade in the one throughflow direction;

FIG. 7 is a profile through the rotor blade of the arrangement of FIG. 6, wherein here however the working medium flows towards the rotor blade in the other throughflow direction;

FIG. 8 illustrates a profile for a further construction of rotor blade;

FIG. 9 illustrates a profile of a further construction of rotor blade;

FIGS. 28 is a front view of a further embodiment of rotor blade;

FIG. 29 is a sectional view of the arrangement of FIG. 28, taken substantially along the line XXIX—XXIX thereof;

FIG. 30 is a sectional view of the arrangement of FIG. 28, taken substantially along the line XXX—XXX thereof; and FIGS. 31 is a sectional view of the arrangement of FIG. 28, taken substantially along the line XXXI—XXXI thereof.

DETAILED DESCRIPTION OF THE PREFERRED EMBODIMENTS

Describing now the drawings, it is to be understood that only enough of the construction of the various embodiments of turbines has been shown as will enable those skilled in this art to readily understand the underlying principles and concepts of the present invention, while simplifying the illustration of the drawings. Furthermore, it is to be understood that the various exemplary embodiments depict turbines wherein air serves as the flow or working medium. Instead of using air it would be possible, however, to construct the turbines, within the teachings of the invention, also such that another gas or a liquid medium, for instance a to-and-fro flowing body of water, can be used as the working medium. If desired, also the technique of partial impingement of the turbine can be used.

Figure 1:
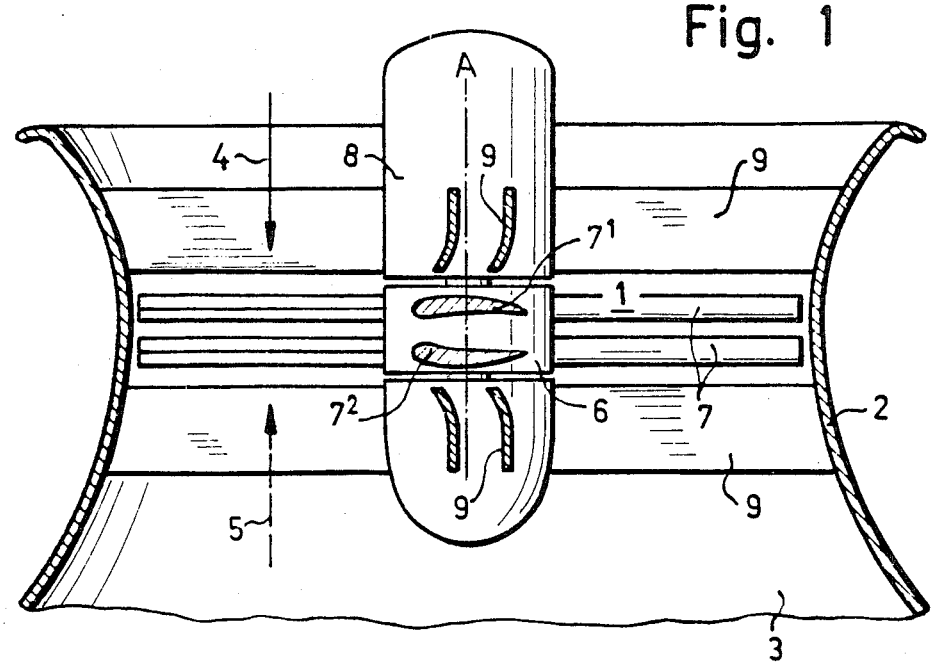
Figure 2:
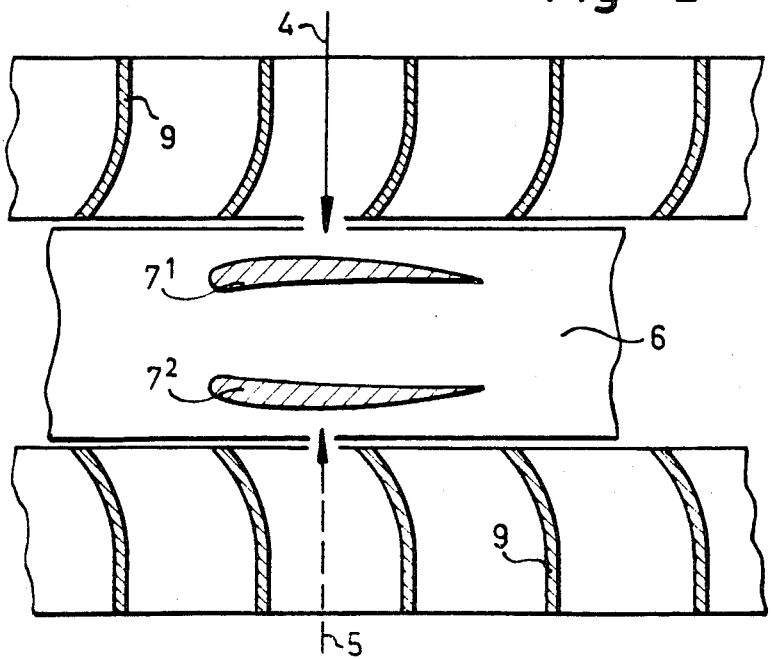
FIG. 2 is a cross-sectional view taken through the guide blades or vanes and the rotor blades or vanes of the air turbine depicted in FIG. 1.

Turning attention now specifically to FIGS. 1 and 2, the air turbine 1 illustrated therein, is arranged at an upper throat 2 of a vessel or duct 3 or the like, wherein only the upper portion of such vessel 3 has been particularly illustrated in the drawings. The vessel 3 immerses by means of its lower half or region into a body of water which is moved by waves. The vessel 3 is open at its lower end and the water level ascends and descends within the vessel 3 under the influence of the movement of the waves of the body of water. The air located in the upper half or portion of the vessel 3 therefore flows through the vessel throat or neck 2 in the one throughflow direction 4 into the vessel 3 or flows out of such vessel 3 in the other throughflow direction 5. This moved air constitutes the working medium for the air turbine 1.

Continuing, it will be understood that the air turbine 1 possesses a hub 6 and rotor blades or vanes 7. The hub 6 is mounted in a central housing 8. Guide vanes or blades 9 are located in the throughflow direction before and after the rotor blades 7, these guide blades 9 connecting the housing 8 with the vessel throat 2. In the housing 8, for instance in the upper portion thereof, there is located a not particularly but conventional electric generator which can be driven or powered by the air turbine 1. According to a different design, the electric generator could be located directly in the rotor hub 6 of the rotor 6, 7.

The aerofoil-shaped profile of the rotor blades 7 is subdivided into aerofoil-shaped profile parts or portions $7^1$ and $7^2$ in order to improve the flow of the working medium about such rotor blades 7. The profile parts $7^1$ and $7^2$ are of the same size and constructed as primary blades and are arranged behind one another and exactly opposite one another in the throughflow directions 4 and 5 of the rotor 6, 7. Each of the profile parts or portions $7^1$ and $7^2$ has a non-symmetrical form or shape with respect to each plane which is perpendicular to the rotational axis A and its mean spacing amounts up to 1.5-fold of the chord length of the profile, preferably amounts to 0.7-fold the chord length of the profile. The non-symmetrical shape of the profile parts or portions allows for a larger angle of attack of the relative incidence flow without break-away of the flow arising.

As best seen by referring to FIG. 2, the guide blades 9 guide the air out of the throughflow direction 4 or 5, as the case may be, which extends essentially parallel to the rotor axis of rotation A, in the circumferential direction of the rotor 6, 7—in other words in the direction of rotation of the rotor—up to a value which can amount to about 30° at the peak diameter, so that with a given relative incidence angle or angle of attack the circumferential velocity, and thus, the power output is increased.

With the exemplary embodiment depicted in FIG. 3, the profile parts or portions $7^1$ and $7^2$, which likewise are situated exactly opposite one another in the throughflow directions 4 and 5, are constructed to be flatter at their mutually confronting surfaces 10 and 11 than at their surfaces 12 and 13 which face away from one another. The front spacing is greater than the rear spacing, i.e. the profile parts are inclined towards the planes perpendicular to the rotor axis, in other words each is non-symmetrically arranged for itself.

FIG. 4 illustrates an embodiment wherein the mutual spacing of the profile parts or portions $7^1$ and $7^2$ at the front end of the profile parts is smaller than at the rear end of the profile parts, and the spacing difference can decrease from the inside,—i.e. for a profile section located near or closer to the axis A—towards the outside, i.e. for a profile section located farther or more remote from the axis A. Under certain circumstances this difference can even change sign, so that the mutual spacing remote from the axis A is larger at the front end than at the rear end of the profile parts, as shown for instance in FIG. 3 while, as mentioned, near the axis it is smaller. Such turbine possesses improved start-up characteristics and renders possible a self-starting operation without any problems.

With the exemplary embodiment of FIG. 5, the profile parts $7^1$ and $7^2$ are offset relative to one another in the profile lengthwise direction. The offset is constructed such that a profile part or portion $7^2$ of the lower row in each case is located between two profile parts or portions $7^1$ of the upper row and vice versa, so that in both flow directions 4 and 5 of the air turbine there prevails the same flow configuration.

With the rotor blade as constructed in FIGS. 6 and 7 the profile parts or portions of the profile of the rotor blades 7 are constructed as primary or main blades $7^3$ and as non-symmetrical and inclined auxiliary blades $7^4$ and $7^5$, which are located to both sides of the primary blade $7^3$. As indicated in FIG. 6 by the chain-dot lines the front auxiliary vane $7^4$, in the one throughflow direction 4 of the rotor, bounds with the primary blade $7^3$ an aerofoil-shaped profile, whereas the rear auxiliary blade $7^5$, for the same throughflow direction 4 of the rotor, forms a support blade for the bounded aerofoil profile. The lead of the auxiliary or pre-blade towards the primary blade can increase with radial distance.

With the exemplary embodiment of FIG. 7, it will be recognised that both of the auxiliary blades $7^4$ and $7^5$ are located symmetrically with respect to the primary or main blade $7^3$. In the other throughflow direction 5 the then forward auxiliary blade $7^5$ together with the primary blade $7^3$ bounds or delimits the aerofoil-shaped profile, whereas the then rear auxiliary blade $7^4$, for the throughflow direction 5, forms a support blade for the bounded aerofoil profile.

With the profile of FIG. 8 the auxiliary blades $7^4$ and $7^5$ are located at the rear or trailing end of the primary or main blade $7^3$, whereas with the profile shown in FIG. 9 the auxiliary blades $7^4$ and $7^5$ have the same length as the primary or main blade $7^3$.

Figure 10:
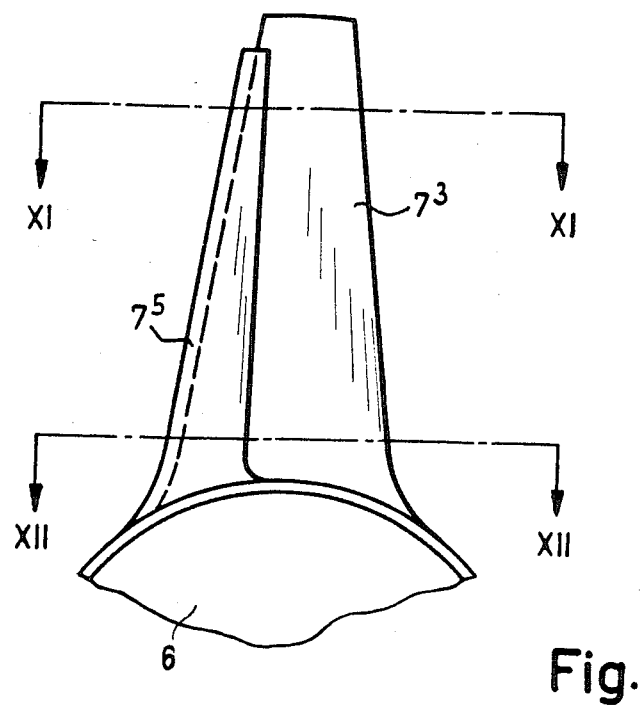
FIG. 10 is a front view of a rotor in one throughflow direction.
Figure 11:
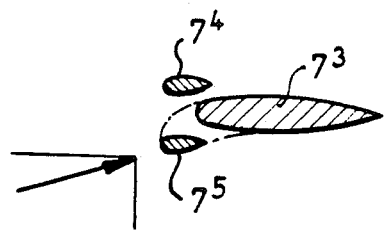
FIG. 11 is a sectional view of the arrangement of FIG. 10, taken substantially along the line XI—XI thereof.
Figure 12:
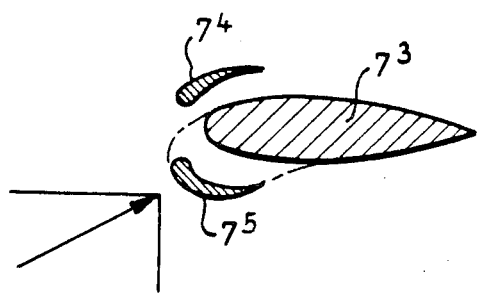
FIG. 12 is a sectional view of the arrangement of FIG. 10, taken substantially along the section line XII—XII thereof.

The lengthwise or longitudinal direction of the rotor blade depicted in FIGS. 10, 11 and 12, extends perpendicular to the axis of rotation of the rotor, as was the case for the exemplary embodiment of FIGS. 1 and 2, i.e. the lengthwise direction of the rotor blades 7 extends away from the axis of rotation of the rotor. Here the cross-section of the profile part or portion $7^3$ becomes more massive or fuller towards the axis of rotation of the rotor and the spacing of the profile parts $7^4$ and $7^5$ increases, so that there is permissible an angle of attack or incidence angle which increases towards the axis of rotation. Furthermore, the radial expanse of the auxiliary blades $7^4$ and $7^5$ is less than that of the primary or main blade $7^3$.

Figure 13:
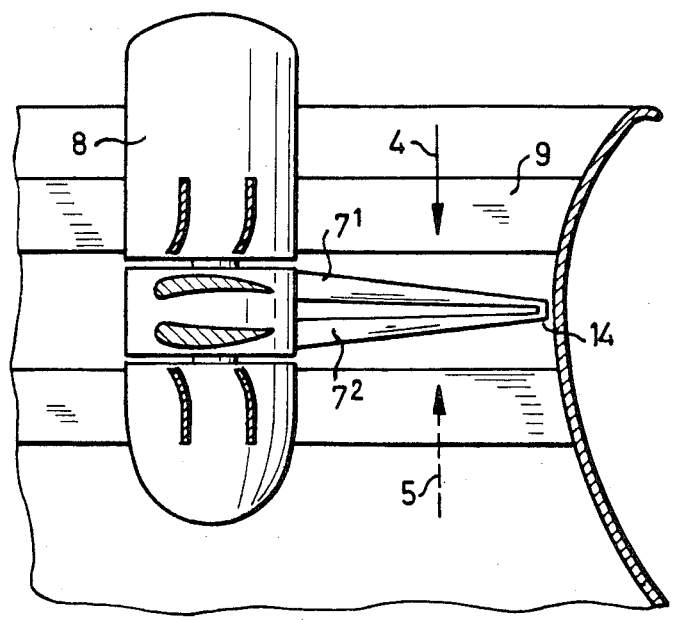
FIGS. 13, 14, 15 and 16 are respective longitudinal sectional views depicting four different embodiments of air turbines.
Figure 14:
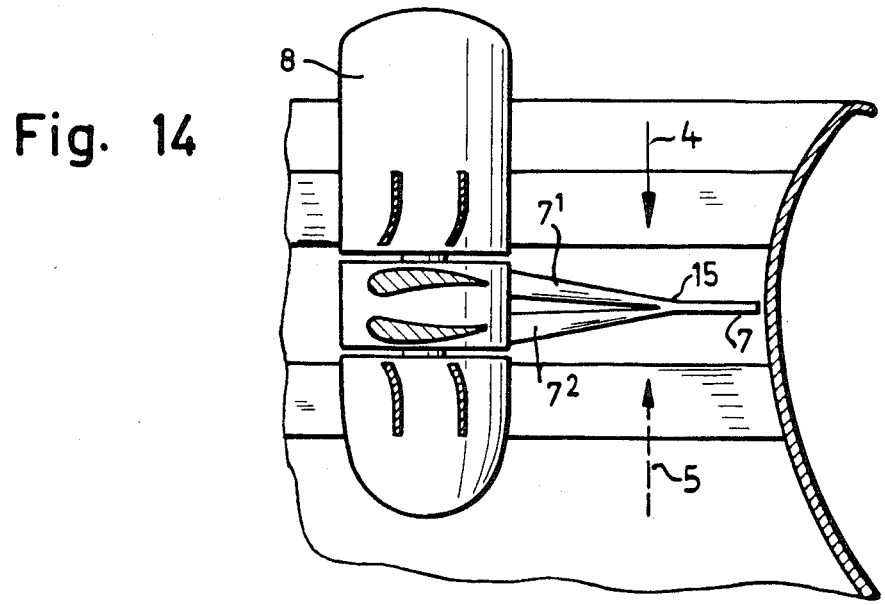

With the construction of air turbines depicted in FIGS. 13 and 14 the profile parts or portions $7^1$ and $7^2$ are interconnected with one another at their ends 14 and 15, respectively, situated remote from the axis of rotation of the rotor. While with the exemplary embodiment of FIG. 13 the profile of the rotor blade is subdivided into profile parts or portions $7^1$ and $7^2$ over the entire length of the rotor blade, with the exemplary embodiment of FIG. 14 the subdivision of the blade into the profile parts $7^1$ and $7^2$ extends only over the radial inner portion of the length of the rotor blade. The radial outer end of the rotor blade 7 is not subdivided into profile parts, as has been shown at the right-hand portion of FIG. 14.

Figure 15:
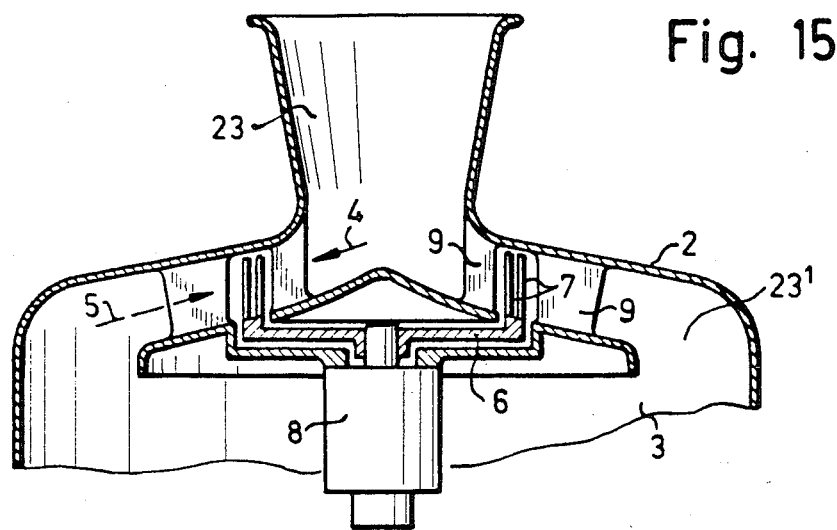

With the air turbine construction depicted in FIG. 15, the lengthwise direction of the rotor blades 7 extends parallel to the axis of rotation of the rotor, so that there is present an equal magnitude circumferential velocity over the entire lengthwise direction of the rotor blades and the incidence angle or angle of attack of the rotor blades is the same over the entire lengthwise direction.

Such type of air turbine with non-symmetrical rotor blade parts or portions parallel to the axis of rotation can be advantageously used also as a wind motor of the Darrieus type, for instance as a further construction and improvement upon the wind motor disclosed in the aforementioned published PCT application PCT/AT79/00007, with improved output and facilitated self-starting operation.

Figure 16:
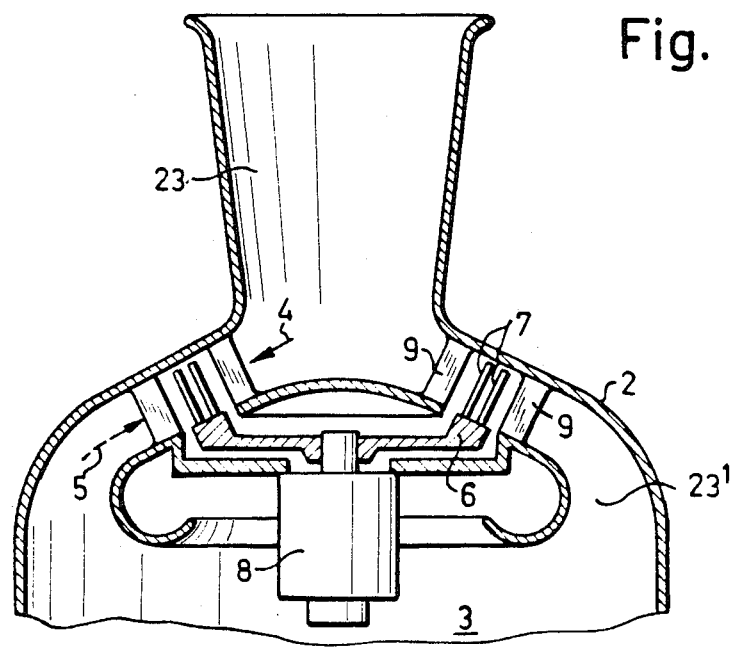

With the turbine construction of FIG. 16 the lengthwise or longitudinal direction of the rotor blades extend at an inclination with respect to the axis of rotation of the rotor, constituting an example of a semi-axial throughflow turbine, whereas the turbine construction for FIG. 1 has the working medium axially flowing therethrough, while the turbine construction of FIG. 15 has the working medium almost flowing radially therethrough. In both of these FIGS. 15 and 16 the flow-technically favourably formed cross-sectional enlargements or enlarged portions 23 and $23^1$ are clearly shown.

Figure 17:
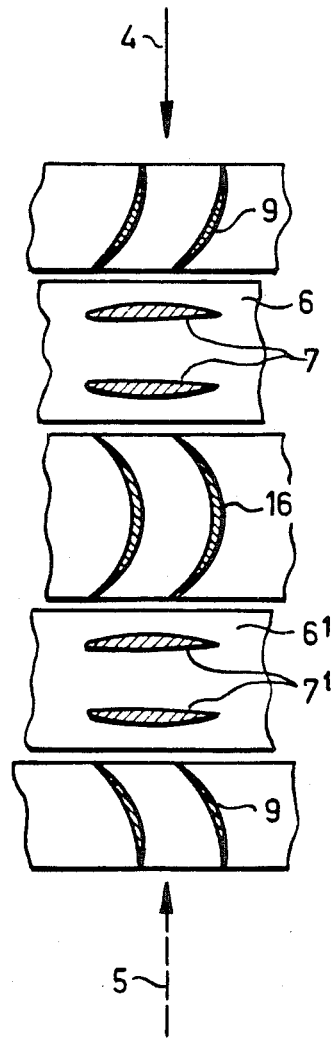
FIG. 17 is a cross-sectional view, corresponding to the showing of FIG. 2, of a further construction of air turbine.

With the turbine construction of FIG. 17 the rotor 6, 7 has arranged thereafter a second rotor $6^1$, $7^1$ while interposing intermediate guide vanes 16.

With the exemplary embodiments illustrated in FIGS. 18 to 27 the profile parts or portions of the profile of the rotor blades are adjustable during reversal of the throughflow directions 4 and 5, respectively. This adjustment is advantageously accomplished automatically by the air flow itself, or by the pressure exerted by the air flow, or also by an indirect transmission.

Figure 18:
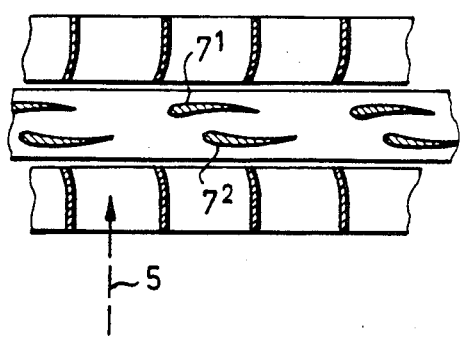
FIGS. 18 and 19 illustrate a profile of a rotor blade respectively adjusted for the one and the other throughflow direction of the working medium.
Figure 19:
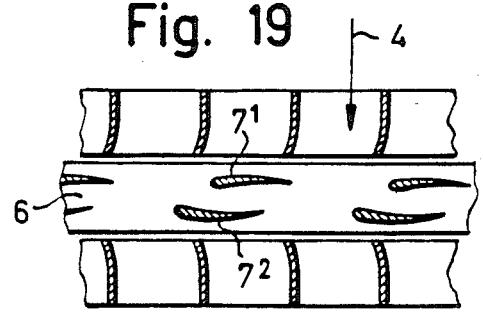

With the exemplary embodiment depicted in FIGS. 18 and 19, two primary main blades $7^1$ and $7^2$ are adjustable relative to one another in the circumferential direction of the rotor. The forward primary blade located in the relevant throughflow direction 4 or 5, as the case may be, is positionally adjusted such that, viewed in direction of rotation, in the circumferential direction of the rotor, it is arranged after the rear primary blade in the throughflow direction.

Figure 20:
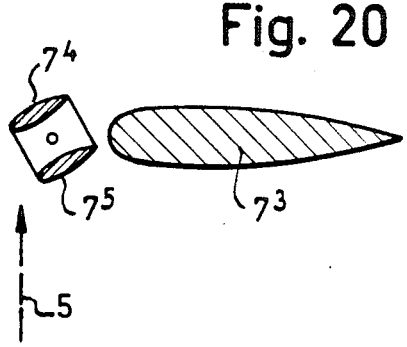
FIGS. 20, 21, 22, 23, 24 and 25 are variant embodiments of the cross-sectional views of the arrangement of FIGS. 18 and 19.
Figure 21:
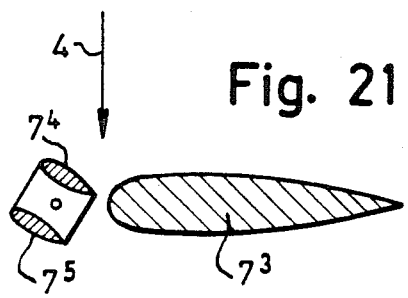

With the exemplary embodiment depicted in FIGS. 20 and 21 the profile parts are formed by a primary blade $7^3$ fixedly connected with the rotor hub and two mutually interconnected auxiliary blades $7^4$ and $7^5$ which can be conjointly adjusted or selectively positioned. The forward auxiliary blade, viewed in each case in the throughflow direction 4 or 5, respectively, forms with the primary blade a markedly domed aerofoil-shaped profile, whereas the rear auxiliary blade, in each case with respect to the throughflow direction, serves as the support blade.

Figure 22:
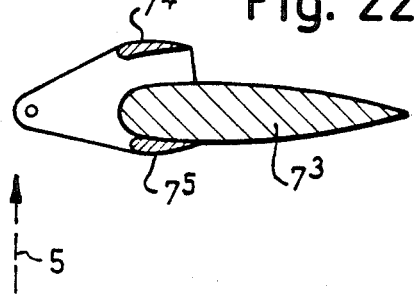
Figure 23:
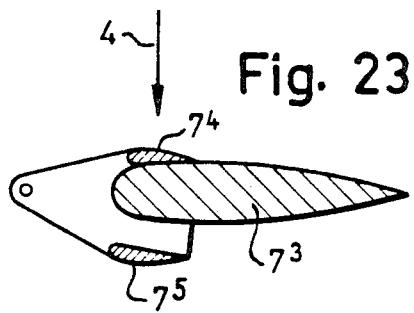

With the profile illustrated in FIGS. 22 and 23, the front auxiliary blade in the momentary throughflow direction 4 or 5, respectively, bears against the primary or main blade $7^3$, so that both profile parts form an aerofoil profile which confronts the inflowing air flow or stream, whereas the rear auxiliary blade, for the same throughflow direction of the rotor, forms a support blade for the bounded aerofoil profile.

Figure 24:
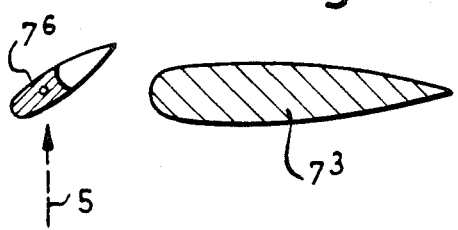
Figure 25:
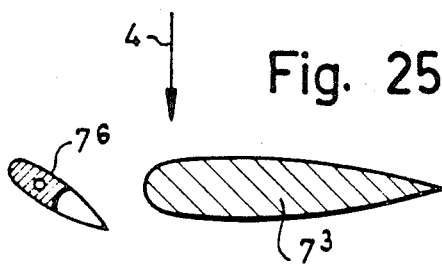

With the exemplary embodiment depicted in FIGS. 24 and 25 there is located, viewed in the direction of rotation of the rotor, a movable auxiliary blade $7^6$ forwardly of a stationary primary or main blade $7^3$, this movable auxiliary blade $7^6$ forming a support blade for the fixed primary blade $7^3$. The auxiliary blade $7^6$ is constructed such that it is in equilibrium as to its weight with respect to its axis of rotation, but however the axis of rotation is located before the point of attack of the lift force of the auxiliary blade, so that the auxiliary blade $7^6$ can be adjusted up to the region of a stop by the air flow. However, instead of pivoting the auxiliary blade $7^6$ the primary blade $7^3$ can be constructed to be pivotable.

The axis of rotation of the auxiliary blade $7^6$, according to the showing of FIGS. 24 and 25, and equally the axes of rotation of the auxiliary blade pairs $7^4$, $7^5$ shown in FIGS. 20 and 21 and FIGS. 22 and 23, respectively, are located in the plane of symmetry of the primary blade $7^3$.

Figure 26:
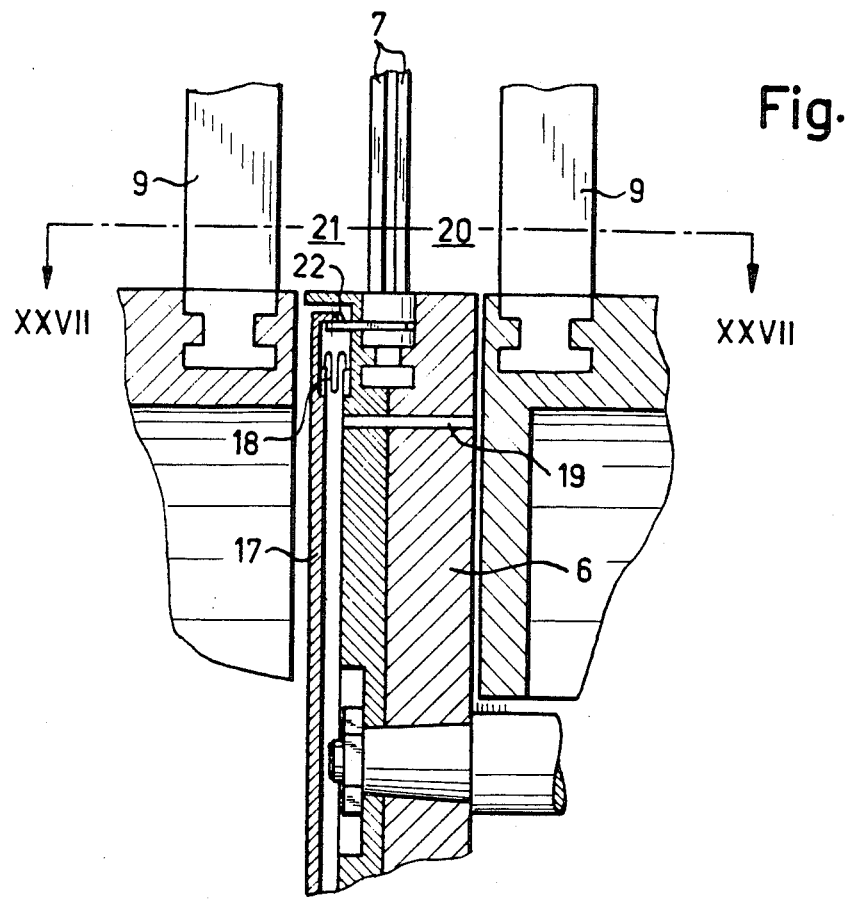
FIGS. 26 is an axial fragmentary sectional view through an air turbine.
Figure 27:
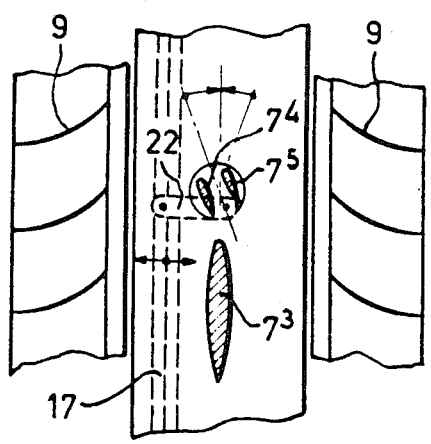
FIGS. 27 is a sectional view of the air turbine depicted in FIG. 26, taken substantially along the line XXVII—XXVII thereof.

With the exemplary embodiment of FIGS. 26 and 27 there is used for the adjustment of the profile parts $7^4$ and $7^5$, the pressure difference of the working medium before and after the rotor during reversal of the throughflow direction of the rotor. A piston or a deformable plate 17 is displaceably or fixedly connected by means of a membrane or diaphragm 18 with the hub 6 of the rotor in the axial direction of the rotor. The one side or face of the piston 17 or equivalent structure is conected by means of at least one conduit or line 19 with the rotor side 20 located at the right of the showing of the drawing. The other side or face of the piston 17 is located at the left side 21 of the rotor. As particularly well recognised by referring to FIG. 27, the piston 17 acts by means of a rod 22 upon the adjustable auxiliary blades $7^4$ and $7^5$, so that such can be reversibly controlled.

The degree of the adjustment can also be determined by the magnitude of the pressure differential. Advantageously, the adjustment is accomplished such that the adjustable profile parts are in their central position at the point in time of the directional change of the throughflow.

With all of the exemplary embodiments, i.e. both for the rotor blades with non-adjustable profile parts or portions secured to the rotor hub and also for the rotor blades which possess profile parts which can be adjusted relative to the rotor hub, the non-symmetrical profile parts or portions are usually arranged symmetrically, in the one throughflow direction, with respect to the other throughflow direction. The rotor blade with a profile subdivided into non-symmetrical profile parts or portions thus possesses the same flow conditions in both throughflow directions as conventional rotor blades possessing a symmetrical profile, however possesses the advantage that a larger angle of attack or incidence angle is possible without break-away of the flow, and thus, there can be attained a greater output and an improved efficiency.

However, with such totally symmetrical profile there exists the problem that the pressure drop between the infeed side and the outfeed side of the turbine is different at different locations of the rotor blades, i.e. is dependent upon the radius or upon the spacing from the axis of rotation A.

In the case of turbines with only one throughflow direction, where there is permissible a non-symmetry, this problem could be solved, for instance, by a twisted configuration of the rotor blades, known to the person skilled in the art under the designation "free vortex" blading. However, as soon as the same flow conditions are required in both opposite throughflow directions, then there no longer would be possible the solution of twisting the blading with symmetrical profiles or profiles composed of symmetrical portions.

The inventive non-symmetrical construction and arrangement of the profile parts or portions renders it possible, however, to maintain the pressure drop independent of the radius, and thus, to prevent a break-away of the flow over all cross-sections, within the blading and the casing or to obtain some other desired radial pressure configuration or course.

In FIGS. 28, 29, 30 and 31 there has been schematically illustrated an exemplary embodiment satisfying these requirements, wherein a primary or main blade $7^3$ and two laterally leading auxiliary blades $7^4$ and $7^5$ radially extend away from the hub 6 and the rotor axis of rotation A. The chord lengths of the non-symmetrical profile parts or portions $7^4$ and $7^5$ and equally the lead of these parts in relation to the part $7^3$ increases with increasing spacing from the axis of rotation A, whereas the chord lengths of the portion or part $7^3$ decreases and the part $7^3$ in fact disappears or terminates in the radial direction before reaching the peak or tip section. At its end 14' the profile parts or portions $7^4$ and $7^5$ are interconnected for reinforcement purposes.

In conjunction with the exemplary embodiment depicted in FIGS. 28 to 31, there is also demonstrated how the blade parts or portions $7^4$ and $7^5$ can be twisted in themselves i.e. in their plane in that, the mutual spacing of the blade parts at the region of the rotor hub 6 at the front is smaller than the spacing of such blade parts at the rear at the region of the rotor hub, as shown in FIG. 30, whereas the converse is true at a location remote from the rotor hub, i.e. the spacing at the front is larger than at the rear, as best seen by inspecting FIG. 31. The spacing at the hub region at the front is smaller, because only in this way can there be accommodated the large angles of attack, which prevail at that location, without break-away of the flow. At a location further towards the outside, where the angle of attack is smaller because of the larger circumferential velocity, the spacing at the rear can be smaller without any danger of break-away or detachment of the flow. This produces an oblique surface which is inclined to such an extent that the air, which flows into the stationary rotor, is deflected and the rotor begins to rotate in the desired directional sense because of the reaction forces. Also at the region of the rotor hub 6 there is an oblique surface which, however, does not contribute anything positive with regard to the self-starting operation. However, because the favourably inclined surfaces possess the larger lever arm or radius the rotor still rotates in the desired directional sense.

The invention has been previously described, by way of example and not limitation, in conjunction with an air turbine. As already explained, however, the teachings of the invention can be advantageously realised also with other flow media, for instance a to-and-fro flowing body of water in tidal power plants, or a different fluid medium.

While there are shown and described present preferred embodiments of the invention, it is to be distinctly understood that the invention is not limited thereto, but may be otherwise variously embodied and practiced within the scope of the following claims.

What I claim is:

1. A turbine comprising:
   a rotatable rotor provided with a rotor hub and rotor blades each having a profiled structure defining a substantially aerofoil-shaped profile;
   a working medium alternately flowing through the rotor in opposite throughflow directions;
   said rotor rotating in the same direction of rotation during both throughflow directions of the working medium;
   the profiled structure of each of the rotor blades being subdivided at least over a portion of the length of the rotor blades into profile parts in order to improve the flow of the working medium around the rotor blades;
   each of said profile parts defining a blade member;
   said blade members being at least in part spaced from one another in the throughflow directions of the working medium; and
   at least one of the profile parts being non-symmetrical to a plane which is perpendicular to the momentary throughflow direction of the working medium and which plane extends through said at least one profile part.

2. The turbine as defined in claim 1, wherein:
   the mutual spacing of the profile parts of the rotor blade at a front end of the profile part is different from the mutual spacing of the profile parts at the rear end of said profile parts.

3. The turbine as defined in claim 1, wherein:
   said profile parts possess a flatter configuration at mutually confronting surfaces thereof than at surfaces of said profile parts which face away from one another.

4. The turbine as defined in claims 1 or 2, wherein:
   said profile parts of a rotor blade define two equal size profile parts constructed as a primary blade; and
   said equal size profile parts being arranged behind one another in the flow direction of the working medium through the rotor.

5. The turbine as defined in claim 4, wherein:
   said profile parts are arranged opposite one another.

6. The turbine as defined in claim 4, wherein:
   said profile parts are arranged offset with respect to one another in circumferential direction of the rotor.

7. The turbine as defined in claim 4, wherein:
   the profile parts have a mutual mean spacing from one another in the throughflow direction of the working medium which amounts up to 1.5-fold the chord length of a profile part.

8. The turbine as defined in claim 7, wherein:
   said mean spacing amounts to about 0.7-fold the chord length of the profile part.

9. The turbine as defined in claims 2 or 3, wherein:
   said profile parts are symmetrically grouped with respect to a plane which is substantially perpendicular to the throughflow direction of the working medium.

10. The turbine as defined in claim 1, wherein:
    the lengthwise direction of the rotor blades extends away from the rotor hub of the rotor.

11. The turbine defined in claim 1, wherein:
    said turbine is used for extracting energy from the movement of the waves of the ocean.

12. The turbine as defined in claim 11, further including:
    a vessel having an upper vessel throat;

said turbine being arranged at the region of the upper throat of said vessel; and said vessel having a lower open end which immerses into the water moved by the waves.

13. The turbine as defined in claim 1, wherein:

said turbine is used for extracting energy from a to-and-fro moving body of water.

14. The turbine as defined in claim 1, wherein:

the difference of the spacing between the front ends and the rear ends of the profile parts becomes smaller with increasing spacing from the axis of rotation of the rotor.

15. The turbine as defined in claim 1, wherein:

said plane extends between opposite ends of said at least one profile part.

16. A turbine comprising:

a rotatable rotor provided with a rotor hub and rotor blades each having a profiled structure defining a substantially aerofoil-shaped profile;

a working medium alternately flowing through the rotor in opposite throughflow directions;

said profiled structure of each said rotor blade being substantially symmetrical relative to a plane which extends normally to said opposite throughflow directions;

said rotor rotating in the same direction of rotation during both throughflow directions of the working medium;

the profiled structure of each of the rotor blades being subdivided at least over a portion of the length of the rotor blades into a profile parts in order to improve the flow of the working medium around the rotor blades;

each of said profile parts defining a blade member;

said blade members being at least in part spaced from one another in the throughflow directions of the working medium; and at least one of the profile parts being non-symmetrical to a plane which extends normally to said opposite throughflow directions of the working medium and which plane extends through said at least one profile part.

* * * * *